Aug. 8, 1939.   A. F. HOWE ET AL   2,169,048
GASOLINE METER DIAL
Filed Oct. 17, 1936   2 Sheets-Sheet 1
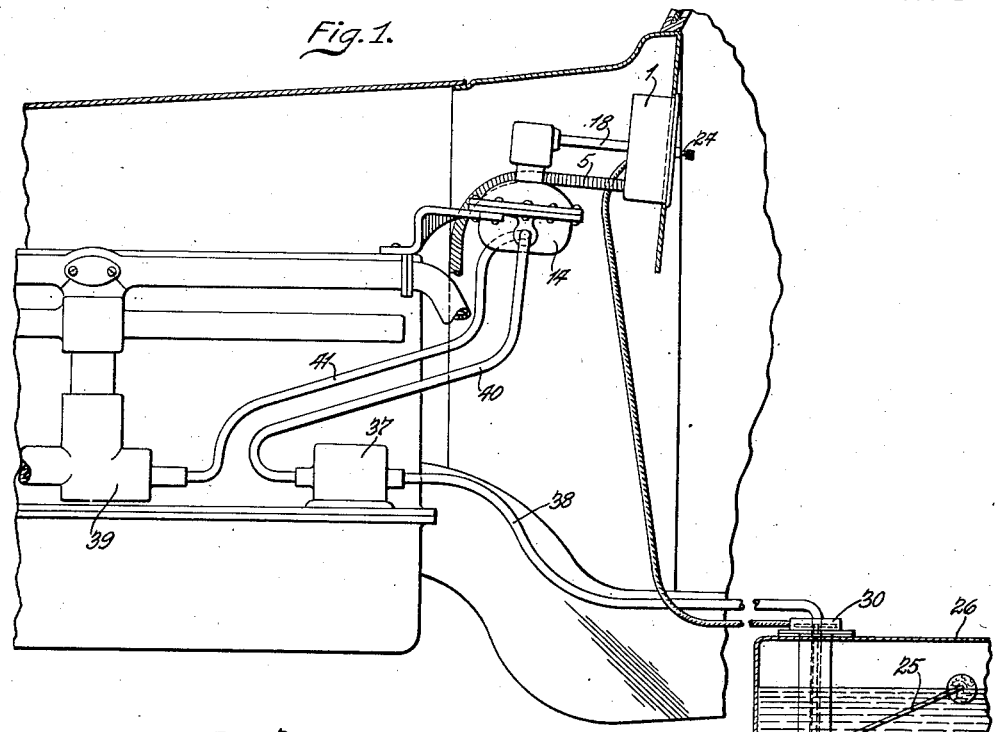
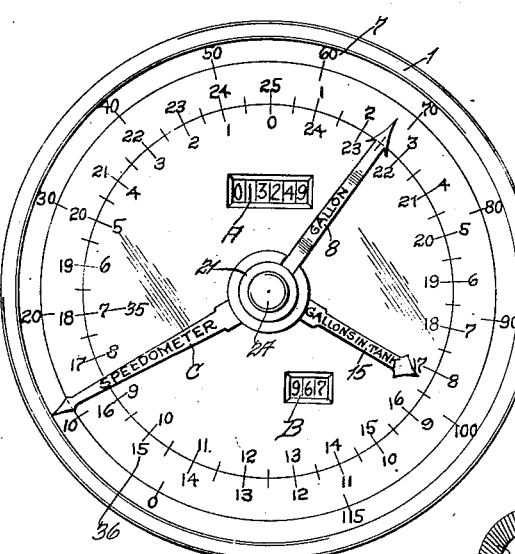
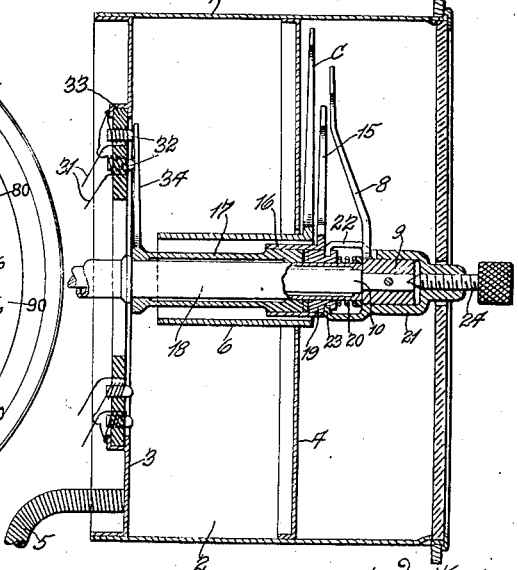
Inventors
Andrew F. Howe
Robert A. Bagnell
by Rippey & Cassidy
Their Attorneys Aug. 8, 1939.  A. F. HOWE ET AL  2,169,048
GASOLINE METER DIAL
Filed Oct. 17, 1936   2 Sheets-Sheet 2
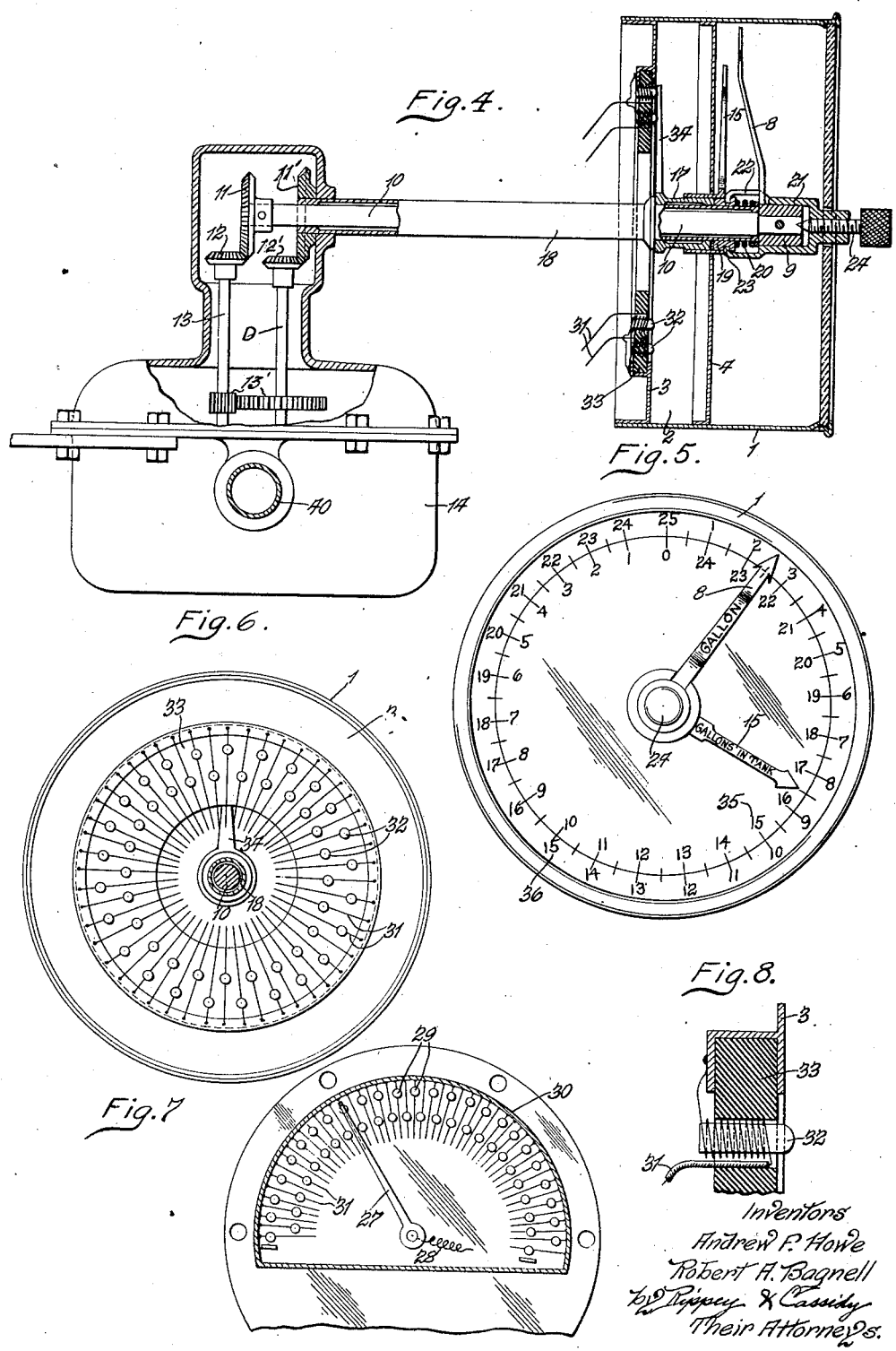
Inventors
Andrew F. Howe
Robert A. Bagnell
by Pippey & Cassidy
Their Attorneys.

Patented Aug. 8, 1939

2,169,048

UNITED STATES PATENT OFFICE 2,169,048

GASOLINE METER DIAL

Andrew F. Howe, University City, and Robert A. Bagnell, La Due, Mo.

Application October 17, 1936, Serial No. 106,150

2 Claims. (Cl. 73—198)

This invention relates to gasoline meter dials, and has special reference to dials mounted on the instrument board of motor vehicles, or elsewhere for convenient observation, to indicate visually any or all of the results and facts obtained by the improved instrument herein disclosed.

Objects of the invention are to provide an improved dial mechanism operated by gasoline flowing from the usual gasoline tank of a motor vehicle through the usual pump and thence through a meter connected with the tube leading from the pump to the carburetor, so that the gasoline passing from the pump to the carburetor will operate the meter and thereby a dial mechanism mounted on the instrument board of the vehicle, or elsewhere for convenient observation by the driver, in cooperative relationship with the usual odometer to indicate the amount of gasoline used in traveling a mile, or any number of miles, and also in cooperative relationship with the usual speedometer; to provide a dial mechanism operated under control of the usual devices in the gasoline tank to indicate the amount or number of gallons of gasoline contained in the tank at any desired time of observation, and also operated by the meter to indicate the amount of gasoline consumed during travel from point to point; to provide a dial mechanism comprising an indicating device making a complete revolution for each gallon of gasoline used from the tank and an indicating device movable continuously during operation of the motor to indicate the amount of gasoline remaining in the tank, and a meter for operating said indicators; and to provide an indicating device operated by the usual gasoline gage to indicate the amount of gasoline consumed during travel from one point to another.

Various other objects and advantages of the invention and its adaptability to many uses should be readily apparent from the following description, reference being made to the annexed drawings, in which—

Fig. 1 is an elevation of the invention applied to a motor vehicle.

Fig. 2 is a view showing the face of the dial mechanism which is assembled in cooperative relationship with the speedometer and the odometer of a motor vehicle.

Fig. 3 is a diametrical vertical sectional view of the dial mechanism shown in Fig. 2, the various pointers being turned to a position in which they all appear in Fig. 3.

Fig. 4 is a sectional view of a dial mechanism assembled apart from the speedometer and odometer and showing the driving connections from the meter to operate the gasoline indicators in the dial mechanism.

Fig. 5 is a plan view of the dial mechanism shown in Fig. 4.

Fig. 6 is a plan view of the magnetic devices mounted in connection with the gallons-in-tank pointer of the indicating mechanism and which cooperates with the magnetic devices shown in Fig. 7 that cooperate directly with the instruments in the gasoline tank to cause operation of the gallons-in-tank pointer through the magnetic devices shown in Fig. 6.

Fig. 8 is an enlarged view of one of the magnetic devices of Fig. 6 or Fig. 7.

As shown in Figs. 2 and 3, the dial mechanism, the total mileage odometer A, the trip mileage odometer B, and the speedometer indicator C are assembled in a single housing 1 for operation by their respective operating mechanisms. The gearing (not shown) for operating the total mileage odometer A, the trip mileage odometer B and the speedometer indicator C is mounted in the housing 1 in a compartment 2 formed between the rear end wall 3 and the partition 4 attached to the housing 2, and said gearing is operated by the usual flexible shaft 5 driven by connections operated by the engine. Since this gearing and the connections for operating the same are conventional and familiar, they are not illustrated in the drawings, because illustration thereof is unnecessary for a complete understanding of the present invention. The speedometer indicator C is attached to a rotary member 6 adapted to be rotated by the gearing contained in the compartment 2. The speedometer indicator C operates in cooperative relationship with an annular mileage scale 7 to indicate the speed at which the vehicle is traveling, which is to say the number of miles per hour at which the vehicle is traveling, as is well known.

The gallon indicator 8 is attached to a hub 9 (Fig. 2), and said hub 9 is attached to a rotary shaft 10 (Figs. 3 and 4). The shaft 10 has attached thereto a pinion 11 meshing with a pinion 12 attached to a conventional meter driven shaft 13, the operating mechanism for said shaft being conventional and well understood and confined within a meter housing 14. The meter driven shaft 13 turns the shaft 10 through one complete revolution when one gallon of gasoline passes through the meter housing 14 and the operating mechanism confined therein.

The gallons-in-tank indicator 15 has a hub 16 attached to a sleeve 17 supported for rotation on a tubular shaft 18. A clutch element 19 is supported by and splined for sliding movements along the tubular shaft 18 and is movable into and out of clutching engagement with the end of the sleeve 17. When the clutch element 19 is in clutching engagement with the sleeve 17, said sleeve 17 will be rotated by the shaft 18 and at the same speed with the shaft 18 when said shaft 18 is rotating; and, when the clutch element 19 is out of engagement with the sleeve 17, said sleeve 17 may rotate and thereby operate the indicator 15 independently of the shaft 18. The shaft 13 turns the shaft 18 one complete revolution for every twenty-five complete revolutions of the shaft 13 through the gearing 13', the shaft D. and the gears 12' and 11'.

A spring 20 mounted on the shaft 18 between the hub 9 and the outer end of the clutch element 19 will move the clutch element 19 into clutching engagement with the sleeve 17 and hold it in such position unless compressed. A sleeve 21 is supported for free and easy rotation about the hub 9 and has a slot 22 through which the indicator 8 extends, and also has its inner end 23 engaging the clutch element 19 so that, when the sleeve 21 is moved outwardly, it will move the clutch element 19 out of engagement with the sleeve 17 in opposition to the spring 20. Since the sleeve 21 rotates freely and easily, it will be rotated by the indicator 8. The screw device 24 is screwed through the outer end of the sleeve 21 into abutting engagement with the outer end of the shaft 10 and is easily rotative in a direction to move the sleeve 21 outwardly a sufficient distance to disengage the clutch element 19 from the end of the sleeve 17 and thereby leave the sleeve 17 freely rotative about and with respect to the shaft 18. When the screw 24 is turned in the opposite direction it will permit the spring 20 to move the clutch element 19 into clutching engagement with the end of the sleeve 17 so that, when the shaft 18 is rotated, the sleeve 17 and thereby the indicator 15 will be rotated by and at the same speed as the shaft 18.

A conventional device 25 (Fig. 1) is mounted in the usual gasoline tank 26 of the motor vehicle and will rotate an electrical contact brush 27 (Fig. 7) as the device 25 moves to different positions in accordance with the variation in the amount of gasoline contained in the tank 26, as is well known. The electrical brush 27 connected with a circuit wire 28 is movable successively into contact with numerous contacts 29 of conventional and known arrangement and mounting and which are supported within a housing 30 on the gasoline tank 26. A wire 31 leads from each contact 29 to a complementary electro-magnet 32 supported by an insulation element 33 attached to an end wall 3 of the housing 1. The electro-magnets 32 extend through the wall 3 but out of electrical contact therewith to positions to control respectively an armature 34 when the respective electro-magnets 32 are energized by engagement of the brush 27 with the respective contacts 29, leaving the remaining contacts 29 and electro-magnets 32 de-energized. It is known that electro-magnets such as 32 may be energized from available sources of electrical energy, such as the battery of an automobile, when circuits from the source of electrical energy are properly closed. And so, the brush 27, acting in cooperative relationship with the contacts 29, acts as an electrical switch for controlling such circuits irrespective of the sources of electrical energy. Therefore, movement of the brush 27 from and to engagement with the respective contacts 29 controls the energizing of the electro-magnets 32. The armature 34 is attached to the sleeve 17 and will be operated through the movement of the conventional device 25, which moves the brush 27 into contact with the respective contacts 29. When the clutch element 19 is out of engagement with the sleeve 17, these connections will turn the armature 34 into engagement with that electro-magnet 32 which has been energized and, by such movement, will turn the indicator 15 to position to cooperate with the annular scale 35 and with the annular scale 36, the scale 35 indicating the amount or number of gallons of gasoline contained and remaining in the tank 26 at any time, and the scale 36 indicating the number of gallons of gasoline that had been removed from the tank 26 during travel of the motor vehicle for instance. To reset the indicator 15 for each filling of the tank, it is only necessary to disengage the clutch 19 from the sleeve 17, so that the electrical mechanism controlled by the device 25 will turn the sleeve 17 and thereby operate the indicator 15 to proper position.

It is now clear that, when the clutch element 19 is out of engagement with the sleeve 17, the indicator 15 will be operated by mechanism under control of the conventional device 25 to indicate the amount or number of gallons of gasoline contained in the tank 26. Also, the indicator 15 will be operated by the conventional device 25 when the tank 26 is being filled with gasoline, in conformity with the amount of gasoline contained in the tank at any moment during filling of said tank with gasoline; and, when no more gasoline is being delivered into the tank 26, the device 25 will cause the indicator 15 to be retained in a stationary position with respect to the dials or scales 35 and 36 to indicate, respectively, the amount or number of gallons of gasoline in the tank and the amount or number of gallons required to fill the tank completely.

In the specific embodiment and relationship of the parts illustrated in Figs. 1 to 8, inclusive, it is assumed that the tank 26 has a capacity of twenty-five gallons, and that twenty-five gallons of gasoline will completely fill said tank or will fill the tank to the desired height. The ratio of the gearing operated by the meter mechanism contained in the housing 14 is such that the indicator 8 will make one complete revolution in a clockwise direction for each gallon of gasoline passing through the meter; and that the gallons-in-tank indicator 15 will move only one numerical step or space in a clockwise direction for each gallon of gasoline passing from the tank 26 through the meter mechanism. Thus the gallons-in-tank indicator 15 passes along the scale 35 in a descending relationship from "0" through "24", "23", toward "0", indicating the number of gallons of gasoline remaining in the tank, while the scale 36 indicates the number of gallons of gasoline that have been removed from the tank and have passed through the meter.

The usual and conventional pump 37 draws gasoline from the tank 26 through the usual tube 38 and, in present-day practice, discharges the gasoline into the carburetor 39. Our invention further departs from present practice by providing a tube 40 from the pump 37 to the meter housing 14 and a tube 41 from the meter housing to the carburetor 39. Thus the pump 37 can deliver gasoline to the carburetor only through the meter mechanism within the meter housing 14, so that the indicator mechanism comprising the indicators 8 and 15 will be operated in the manner heretofore described by gasoline passing through the meter mechanism when the clutch element 19 is in engagement with the sleeve 17.

To the extent indicated by like reference numerals applied to similar parts, the device shown in Figs. 4 and 5 is the same as the device shown in Figs. 1, 2 and 3. In fact, the only differences between the two devices are that, in the device illustrated in Figs. 4 and 5, the total mileage odometer A, the trip mileage odometer B, the speedometer indicator C and its connections, the flexible shaft 5 for operating the speedometer and odometer gearing, and the annular mileage scale 7, are omitted.

In the simplified mechanism shown in Fig. 9, the conventional gage operating device 42 is contained in a gasoline tank (not shown in Fig. 9), and is the analogue of the conventional device 25 shown in Fig. 1. Through appropriate and known connections 43, the device 42 will operate a rheostat brush or contact member 44 along and from coil to coil of a rheostat 45 electrically connected with the rocking member 46 of an electro-magnet 47. The rocking member 46 operates the usual gasoline gage pointer through an arc of a circle in the gasoline gage mounted on the instrument board of the automobile, in the usual manner, according to the rise and fall of gasoline within the tank, the electro-magnet being energized conventionally.

It should now be apparent that this invention attains all of its intended functions with a high degree of accuracy and precision, and is capable of wide variation within equivalent limits without departure from the nature and principle thereof.

We claim:

1. In a motor vehicle having a tank for containing gasoline, a carburetor for receiving gasoline from said tank, and a pump for causing flow of gasoline from said tank to said carburetor; meter mechanism through which said gasoline is forced by said pump to said carburetor, a shaft, gearing operated by the gasoline passing through said meter for rotating said shaft, two annular dials concentric with each other and with said shaft, an indicator attached to said shaft and cooperating with one of said dials to indicate the amount of gasoline required to fill the tank, a shaft concentric with said first named shaft and with said dials, an indicator attached to said second shaft and cooperating with said other dial to indicate the amount of gasoline contained in the tank, and mechanism for rotating said second shaft by said gearing.

2. In a motor vehicle having a tank for containing gasoline, a carburetor for receiving gasoline from said tank, and a pump for causing flow of gasoline from said tank to said carburetor; meter mechanism through which said gasoline is forced by said pump to said carburetor, two concentric dials, a pair of shafts concentric with each other and with said dials, an indicator attached to each of said shafts and cooperating with said respective dials for indicating the amount of gasoline contained in said tank and the amount of gasoline that had been withdrawn from said tank respectively, gearing operated differentially by the gasoline passing through said meter for operating said indicators differentially with respect to said dials, and devices for releasing one of said indicators from its said shaft while the other indicator remains attached to its shaft and setting both of said indicators to a starting position.

ANDREW F. HOWE.
ROBERT A. BAGNELL.